US008839428B1

(12) United States Patent
Oliver et al.

(10) Patent No.: US 8,839,428 B1
(45) Date of Patent: Sep. 16, 2014

(54) SYSTEMS AND METHODS FOR DETECTING MALICIOUS CODE IN A SCRIPT ATTACK

(75) Inventors: Ian Oliver, Manly Vale (AU); Jonathan San Jose, Wollstonecraft (AU)

(73) Assignee: Symantec Corporation, Mountain View, CA (US)

( * ) Notice: Subject to any disclaimer, the term of this patent is extended or adjusted under 35 U.S.C. 154(b) by 142 days.

(21) Appl. No.: 12/968,526

(22) Filed: Dec. 15, 2010

(51) Int. Cl.
*G06F 11/00* (2006.01)
(52) U.S. Cl.
USPC .............................. 726/23; 709/224; 726/25
(58) Field of Classification Search
CPC ..................... H04L 63/1416; H04L 63/1433
See application file for complete search history.

(56) References Cited

U.S. PATENT DOCUMENTS

| | | | |
|---|---|---|---|
| 7,225,468 B2* | 5/2007 | Waisman et al. | 726/23 |
| 7,254,632 B2* | 8/2007 | Zeira et al. | 709/224 |
| 7,555,777 B2* | 6/2009 | Swimmer et al. | 726/23 |
| 7,650,640 B1* | 1/2010 | Levy | 726/24 |
| 7,739,737 B2* | 6/2010 | Christodorescu et al. | 726/24 |
| 7,854,002 B2* | 12/2010 | Mohanan et al. | 726/22 |
| 8,307,432 B1* | 11/2012 | Feng | 726/22 |
| 8,312,537 B1* | 11/2012 | Nachenberg et al. | 726/22 |
| 8,402,541 B2* | 3/2013 | Craioveanu et al. | 726/23 |
| 8,448,241 B1* | 5/2013 | Kadakia | 726/22 |
| 8,549,624 B2* | 10/2013 | Alme | 726/22 |
| 2006/0253458 A1* | 11/2006 | Dixon et al. | 707/10 |
| 2006/0253582 A1* | 11/2006 | Dixon et al. | 709/225 |
| 2009/0013405 A1* | 1/2009 | Schipka | 726/22 |
| 2009/0044024 A1* | 2/2009 | Oberheide et al. | 713/188 |
| 2009/0282476 A1* | 11/2009 | Nachenberg et al. | 726/22 |
| 2009/0300764 A1* | 12/2009 | Freeman | 726/24 |
| 2009/0328185 A1* | 12/2009 | Berg et al. | 726/13 |
| 2010/0031359 A1* | 2/2010 | Alme | 726/24 |
| 2010/0037033 A1* | 2/2010 | Karecha et al. | 711/217 |
| 2010/0162398 A1* | 6/2010 | Karecha et al. | 726/23 |
| 2010/0205674 A1* | 8/2010 | Zorn et al. | 726/25 |
| 2010/0235913 A1* | 9/2010 | Craioveanu et al. | 726/23 |

OTHER PUBLICATIONS

Bilar, "Opcodes as predictor for malware," 2007, Int. J. Electronic Security and Digital Forensics, vol. 1, No. 2, pp. 156-168.*
Prabhu "Smashing the Stack with Hydra: The Many Heads of Advanced Polymorphic Shellcode," Aug. 31, 2009, pp. 1-20.*
DidierStevens, "Mitigating Heap Sprays", Windows Systems Forums, posted Oct. 3, 2010-3:55 AM, HeapLocker (version 0.0.0.1), retrieved from http://web.archive.org/web/20120506084857/http://www.governmentsecurity.org/forum/topic/32920-mitigating-heap-sprays, pp. 1-3.*

* cited by examiner

*Primary Examiner* — Kaveh Abrishamkar
*Assistant Examiner* — James J Wilcox
(74) *Attorney, Agent, or Firm* — Holland & Hart LLP

(57) ABSTRACT

A computer-implemented method to detect malicious code in a script attack, is described. An activity associated with calling a function is detected. An operation code set associated with the activity to call the function is identified. A predetermined sequence of characters included in the operation code set is identified. The identified predetermined sequence of characters is analyzed. The operation code set is classified as malicious or non-malicious based on the analysis of the predetermined sequence of characters.

12 Claims, 10 Drawing Sheets

SYSTEMS AND METHODS FOR DETECTING MALICIOUS CODE IN A SCRIPT ATTACK

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies is important to anyone who uses and relies on computers.

Computing systems may be capable of accessing information across a network connection. For example, a computing system may access information from the World Wide Web. This information may be accessed by using a web browser to locate a desired website that includes the information. Developers of malware, however, may engage a script attack that affects the functionality of the web browser or other functions of the computing system. As a result, benefits may be realized by providing system and methods for detecting malicious code in a script attack.

SUMMARY

According to at least one embodiment, a computer-implemented method to detect malicious code in a script attack, is described. An activity associated with calling a function is detected. An operation code set associated with the activity to call the function is identified. A predetermined sequence of characters included in the operation code set is identified. The identified predetermined sequence of characters is analyzed. The operation code set is classified as malicious or non-malicious based on the analysis of the predetermined sequence of characters.

In one embodiment, the operation code set includes a no operation (NOP) sled. In one configuration, the operation code set includes shellcode. In one example, the called function comprises a JavaScript function. The JavaScript function may include at least one of the following functions: Unescape, Eval, CharCodeAt, Split, or Char.

In one embodiment, at least one non-printable character included in the operation code set is identified. In addition, two consecutive non-printable characters included in the operation code set may be identified. At least one printable character included in the operation code set may also be identified. The at least one printable character may be allowed to execute when the at least one printable character is included in an operation code set for printable characters.

A computing device configured to detect malicious code in a script attack is also described. The computing device may include a processor and memory in electronic communication with the processor. The computing device may further include a protection application configured to detect an activity associated with calling a function, and identify an operation code set associated with the activity to call the function. The protection application may also be configured to identify a predetermined sequence of characters included in the operation code set, and analyze the identified predetermined sequence of characters. The protection application may be further configured to classify the operation code set as malicious or non-malicious based on the analysis of the predetermined sequence of characters.

A computer-program product for detecting malicious code in a script attack is also described. The computer-program product may include a computer-readable medium having instructions thereon. The instructions may include code programmed to detect an activity associated with calling a function, and code programmed to identify an operation code set associated with the activity to call the function. The instructions may further include code programmed to identify a predetermined sequence of characters included in the operation code set, and code programmed to analyze the identified predetermined sequence of characters. The instructions may also include code programmed to classify the operation code set as malicious or non-malicious based on the analysis of the predetermined sequence of characters.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
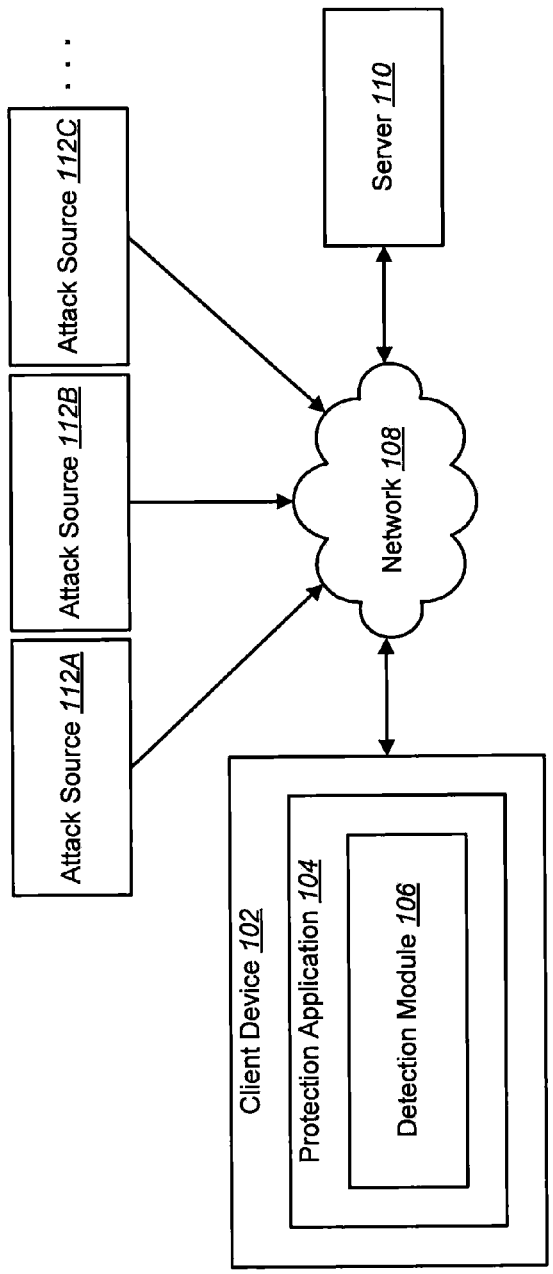
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Detailed Description of Exemplary Embodiments

In computer technology, operation code (opcode) may be the portion of a machine language instruction that specifies the operation to be performed. Opcodes may be found in byte codes and other representations intended for a software interpreter. These software based instruction sets (i.e., opcode sets) may employ higher-level data types and operations than most hardware counterparts. For example, an opcode set may be provided in the JavaScript language. JavaScript may be used to write functions that are embedded in or included from hyper-text markup language (HTML) pages that interact with Document Object Model (DOM) of the page. A web browser is a common host environment for JavaScript. Web browsers may user a public application programming interface (API) to create host objects responsible for reflecting the DOM into JavaScript.

JavaScript may provide the potential for malicious authors to deliver scripts to run on a client computing device via the web. Many browser exploits include no-operation performed (NOP) sleds in these scripts that are delivered to client computing devices via the web. A NOP may be assembly language instructions, sequence of programming language statements, or computer protocol commands that effectively do nothing at all. In some instances, a NOP opcode may be used to form a NOP sled, which may allow code to execute when the exact value of the instruction pointer is indeterminate (e.g., when a buffer overflow causes a function's return address on the stack to be overwritten). In other words, a NOP sled may be a sequence of NOP instructions meant to "slide" a central processing unit's (CPU's) instruction execution flow to its final, desired destination. As a result, NOP sleds may be used in buffer overflows and similar exploits designed to take over a program's execution path.

In order for the exploiting scripts to supply NOP sleds to targets, the scripts may use a set of functions to convert the string text values of the NOP sleds. If the NOP sleds are detected, then the exploiting Java scripts may also be detected and blocked (even for previously unknown, new targets) allowing for zero day detection. Protection applications presently use a set list of NOP sleds that form the set of all the NOPs appearing in several Java script functions, such as Unescape, Eval, CharCodeAt, Split (return value *), and Char. Examples of NOP sleds that are currently included in the list of NOP sleds may include:

```
{"\x04\x04\x04\x04"},
{"\x05\x05\x05\x05"},
{"\x08\x08\x08\x08"},
{"\x09\x09\x09\x09"},
{"\x0C\x0C\x0C\x0C"},
{"\x0A\x0A\x0A\x0A"},
{"\x0b\x0b\x0b\x0b"},
{"\x0D\x0D\x0D\x0D"},
{"\x90\x90\x90\x90"},
{"\x11\x11\x11\x11"},
{"\x42\x42\x42\x42"},
{"\x43\x43\x43\x43"},
{"\x49\x49\x49\x49"},
{"\x4a\x4a\x4a\x4a"},
{"\x4b\x4b\x4b\x4b"},
{"\x48\x48\x48\x48"},
{"\x41\x41\x41\x41"},
{"\x0b\x0c\x0b\x0c"},
{"\x92\xb2\x1c\x99"},
{"\x0D\x0C\x0D\x0C"},
{"\x97\x97\x97\x97"}.
```

When a website script calls a JavaScript function, such as the functions provided above (e.g., Unescape, Eval, CharCodeAt, Split, and Char), and one of the above NOP sleds are detected in the opcode, the NOP sled may be classified as malicious. To mitigate false positives, if the website is on a white list, the reporting of the NOP sled may be done silently.

A shortcoming with the current method described above is that it is limited to the list of currently known NOP sleds to detect new attacks on objects and other targets. The present system and methods provide a new NOP sled detection system for script attacks on web browsers.

FIG. 1 is a block diagram illustrating one embodiment of an environment in which the present systems and methods may be implemented. In one configuration, a client device 102 may communicate with a server 110 across a network connection 108. In one example, one or more attacks may be introduced to the client device 102 from an attack source 112A, 112B, 112C. The attacks originating from an attack source 112A, 112B, 112C may disrupt the processing capabilities of the client device 102. In addition, an attack may manipulate data stored on the client device 102.

In one configuration, the client device 102 may include a protection application 104 that may protect the client device 102 from an attack originating from an attack source 112A, 112B, 112C. In one example, the protection application 104 may include a detection module 106 that may detect an attack on the client device 102. The client device 102 may communicate information regarding a detected attack to the server 110. The server may then analyze the information regarding the attack to determine if the attack is malicious or if the attack has been improperly identified by the client device 102 as an attack (i.e., a false positive).

Figure 2:
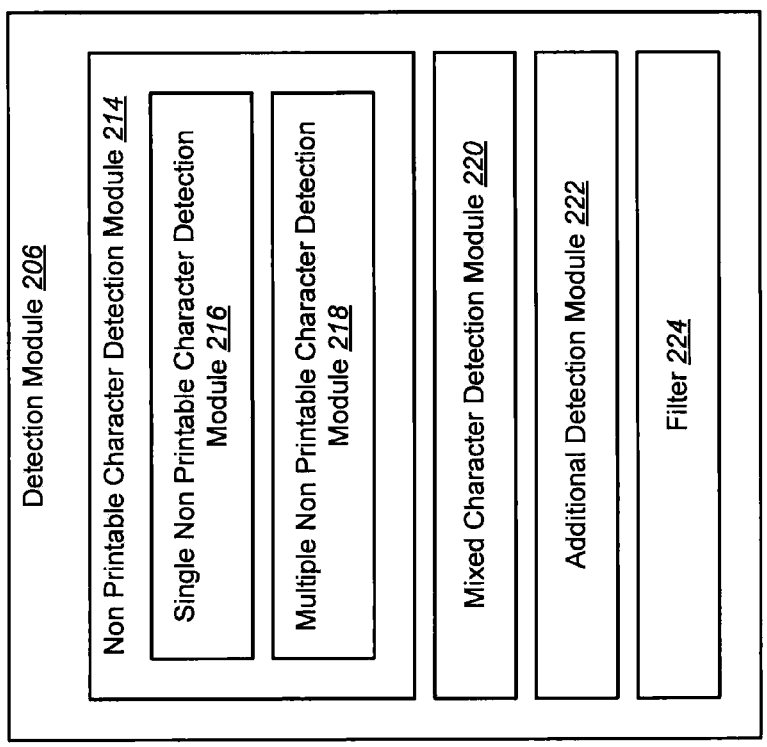
FIG. 2 is a block diagram illustrating one embodiment of a detection module.

FIG. 2 is a block diagram illustrating one embodiment of a detection module 206. In one configuration, the detection module 206 may include a non-printable character detection module 214, a mixed character detection module 220, an additional detection module 222, and a filter 224.

In one embodiment, the non-printable character detection module 214 may include a single non-printable character detection module 216 and a multiple non-printable character detection module 218. In one example, the single non-printable character detection module 216 may analyze an opcode set to detect non-printable content. In one configuration, the opcode set may include a NOP sled. In particular, the single non-printable character detection module 216 may detect any one non-printable character that is in the opcode set for single byte instructions. When the single non-printable character detection module 216 detects any one non-printable character in the opcode set for single byte instructions, the opcode set may be blocked. Alternatively, or additionally, a user may receive a warning message or a report may be silently sent to the user as a remediation action. Examples of single byte NOPs that include non-printable characters may be, but are not limited to, the following:

```
0x90" => nil, # nop
0x97" => [ 'eax', 'edi' ], # xchg eax,edi
0x96" => [ 'eax', 'esi' ], # xchg eax,esi
0x95" => [ 'eax', 'ebp' ], # xchg eax,ebp
0x93" => [ 'eax', 'ebx' ], # xchg eax,ebx
```

```
0x92" => [ 'eax', 'edx' ], # xchg eax,edx
0x91" => [ 'eax', 'ecx' ], # xchg eax,ecx
0x99" => [ 'edx' ], # cdq
0xfc" => nil, # cld
0xfd" => nil, # std
0xf8" => nil, # clc
0xf9" => nil, # stc
0xf5" => nil, # cmc
0x98" => [ 'eax' ], # cwde
0x9f" => [ 'eax' ], # lahf
0x9b" => nil, # wait
0x60" => [ 'esp' ], # pusha
0x0e" => [ 'esp', 'align' ], # push cs
0x1e" => [ 'esp', 'align' ], # push ds
0x06" => [ 'esp', 'align' ], # push es
0x16" => [ 'esp', 'align' ], # push ss
0xd6" => [ 'eax' ], # salc
```

In one example, the multiple non-printable character detection module 218 may also detect non-printable content in an opcode set. In particular, the multiple non-printable character detection module 218 may detect any two consecutive non-printable characters that are in the opcode set for two byte instructions. When the multiple non-printable character detection module 218 detects these non-printable characters, a warning or silent report may be sent to a user. In addition, the opcode set may be blocked from executing when the multiple non-printable character detection module 218 detects any two consecutive non-printable characters in the opcode set for two-byte instructions.

In another embodiment, the multiple non-printable character detection module 218 may also detect any sequence of two, three, or four non-printable one-byte or two-byte instructions in a possible opcode set. If a sequence of two, three, four non-printable characters are detected in an opcode set of one-byte or two-byte instructions, a stronger action may be triggered to remediate the detection of these characters. For example, the opcode set may be completely blocked from executing on the client device 102 and a notification may be sent to a user.

The mixed character detection module 220 may detect mixed non-printable characters and printable characters within an opcode set that includes a NOP sled. In one example, the mixed character detection module 220 may allow printable characters as long as the printable characters are in an opcode set for printable characters. Examples of single byte NOPs that include printable characters may be, but are not limited to, the following:

```
0x4d" => [ 'ebp' ], # dec ebp
0x48" => [ 'eax' ], # dec eax
0x47" => [ 'edi' ], # inc edi
0x4f" => [ 'edi' ], # dec edi
0x40" => [ 'eax' ], # inc eax
0x41" => [ 'ecx' ], # inc ecx
0x37" => [ 'eax' ], # aaa
0x3f" => [ 'eax' ], # aas
0x27" => [ 'eax' ], # daa
0x2f" => [ 'eax' ], # das
0x46" => [ 'esi' ], # inc esi
0x4e" => [ 'esi' ], # dec esi
0x4a" => [ 'edx' ], # dec edx
0x44" => [ 'esp', 'align' ], # inc esp
0x42" => [ 'edx' ], # inc edx
0x43" => [ 'ebx' ], # inc ebx
0x49" => [ 'ecx' ], # dec ecx
0x4b" => [ 'ebx' ], # dec ebx
0x45" => [ 'ebp' ], # inc ebp
0x4c" => [ 'esp', 'align' ], # dec esp
0x50" => [ 'esp' ], # push eax
0x55" => [ 'esp' ], # push ebp
0x53" => [ 'esp' ], # push ebx
0x51" => [ 'esp' ], # push ecx
0x57" => [ 'esp' ], # push edi
0x52" => [ 'esp' ], # push edx
0x56" => [ 'esp' ], # push esi
0x54" => [ 'esp' ], # push esp
0x58" => [ 'esp', 'eax' ], # pop eax
0x5d" => [ 'esp', 'ebp' ], # pop ebp
0x5b" => [ 'esp', 'ebx' ], # pop ebx
0x59" => [ 'esp', 'ecx' ], # pop ecx
0x5f" => [ 'esp', 'edi' ], # pop edi
0x5a" => [ 'esp', 'edx' ], # pop edx
0x5e" => [ 'esp', 'esi' ], # pop
```

An additional detection module 222 may detect all the characters in a particular opcode set. The additional detection module 222 may perform additional lexicon checks, such as the percentage for length and fewer spaces. Further, the additional detection module 222 may detect when no matches occur between characters in the opcode set and a basic dictionary (language-dependent). In one embodiment, checks to filter widely used encoder tools common "artifact" may be done (where they exist because it may be difficult to make a total new unique printable NOP and/or shellcode string).

In order to limit false positives, the detection actions provided above may be filtered by the filter 224. In one embodiment, the filter 224 may specify that the action is only triggered if the website from where the script or chained uniform resource locators (URLs) immediate to this are of low reputation. In addition, the action may be triggered if an action that is initiated for exploitation could cause damage to a user (i.e., loss of money, infection, sensitive API calls, etc.). As a further example, the detection actions may be triggered if the action initiated for exploitation could cause damage by initiating a file download or entry of details to a malicious website. The filter 224 may also be used to filter false positives by specifying that the action is only triggered if a certain repetition of the detection occurs.

In one embodiment, an attack sequence may include both a NOP sled section and a shellcode section. The detection module 206 may be implemented or applied to each section separately and also the combination as a whole. Further, for non-printable character examples, a percentage may be applied so that when a particular threshold is satisfied, the detection module 206 may determine that a particular opcode set (that includes a NOP section and/or a shellcode section) is invalid.

In one configuration, the detection module 206 may apply checks on various JavaScript functions. For example, the checks may be applied on, but not limited to, the following JavaScript functions: Unescape, Eval, CharCodeAt, Split, and Char. In addition, the detection module 206 may apply the checks on variables built during the execution of a script. As indicated above, the checks may be applied on a single call to the checked JavaScript functions/variables or to the sum of all calls to these functions as found at the exit from the script's execution. In one embodiment, the results may be aggregated at a back-end server 110 in order to identify correct detections and false positives.

Figure 3:
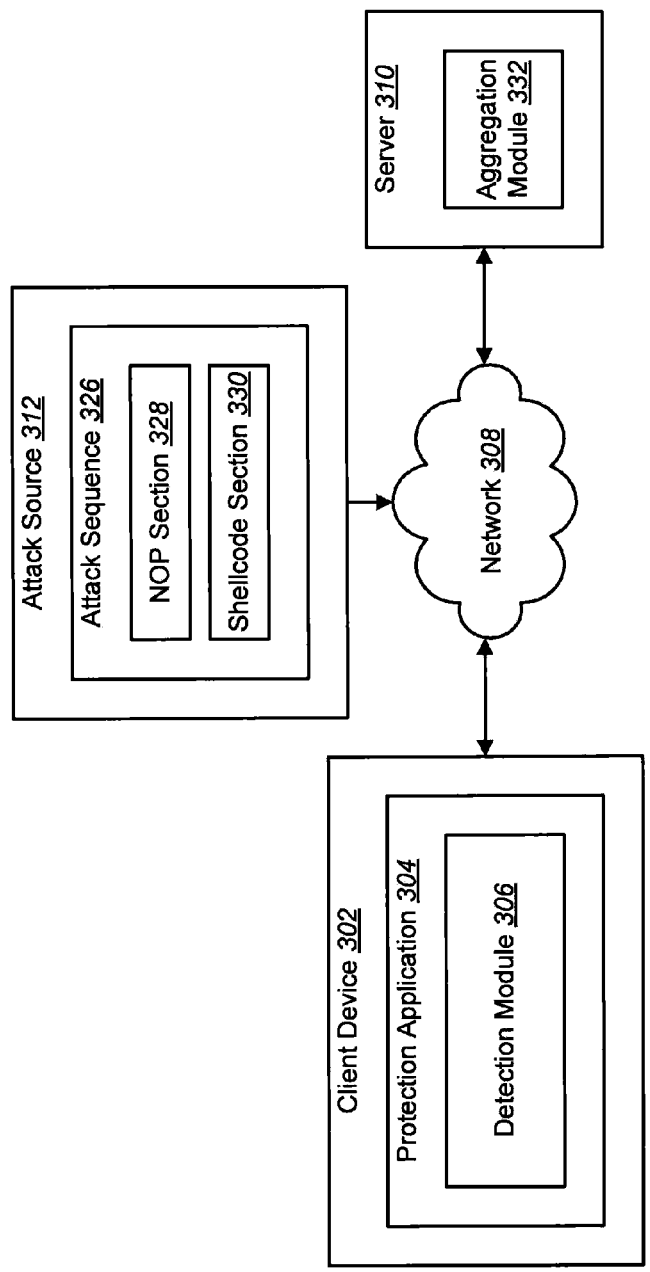
FIG. 3 is a block diagram illustrating one embodiment of a client device that may implement the present systems and methods.

FIG. 3 is a block diagram illustrating one embodiment of a client device 302 that may implement the present systems and methods. In one example, the client device 302 may include a protection application 304 that may protect against an attack sequence 326 originating from an attack source 312.

In one configuration, the protection application 304 may include a detection module 306. As previously described, the detection module 306 may detect a NOP section 328 and/or a shellcode section 330 that may be included as part of the attack sequence 326. The attack sequence 326 may be a java script that includes an opcode set.

In one example, the detection module 306 may transmit information regarding the attack sequence 326 to a server 310 (through the network 308, for example). The server 310 may include an aggregation module 332 that may collect and aggregate information received from various client devices, such as the client device 302. The aggregation module 332 may then aggregate the various information regarding multiple NOP sections and shellcode sections that may be classified as malicious.

Figure 4:
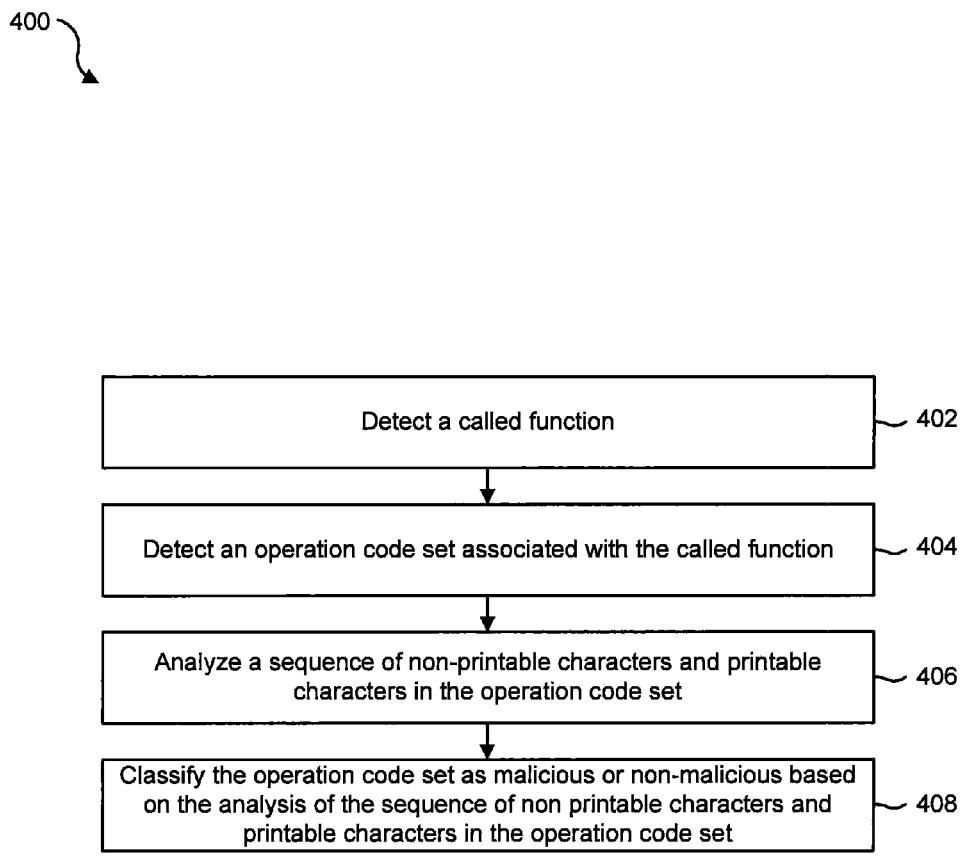
FIG. 4 is a flow diagram illustrating one embodiment of a method to detect malicious code in script attacks.

FIG. 4 is a flow diagram illustrating one embodiment of a method 400 to detect malicious code in script attacks. In one configuration, the method 400 may be implemented by the protection application 104. Examples of malicious code may be, but are not limited to, NOP sleds and shellcode that may be included in an opcode set.

In one example, a called function may be detected 402. For example, the opcode set may call a JavaScript function such as, but not limited to, Unescape, Eval, CharCodeAt, Split, Char, and the like. In one configuration, the opcode set associated with the called function may be detected 404. The opcode set may include NOP sleds, shellcode, etc. A sequence of non-printable characters and printable characters in the opcode set may be analyzed 406. The opcode set may be classified 408 as malicious or non-malicious based on the analysis of the sequence of non-printable characters and printable characters in the opcode set. In one example, information regarding the opcode set may be transmitted to a backend server 110 that determines whether a section in the opcode set (such as a NOP sled, shellcode, etc.) is malicious.

Figure 5:
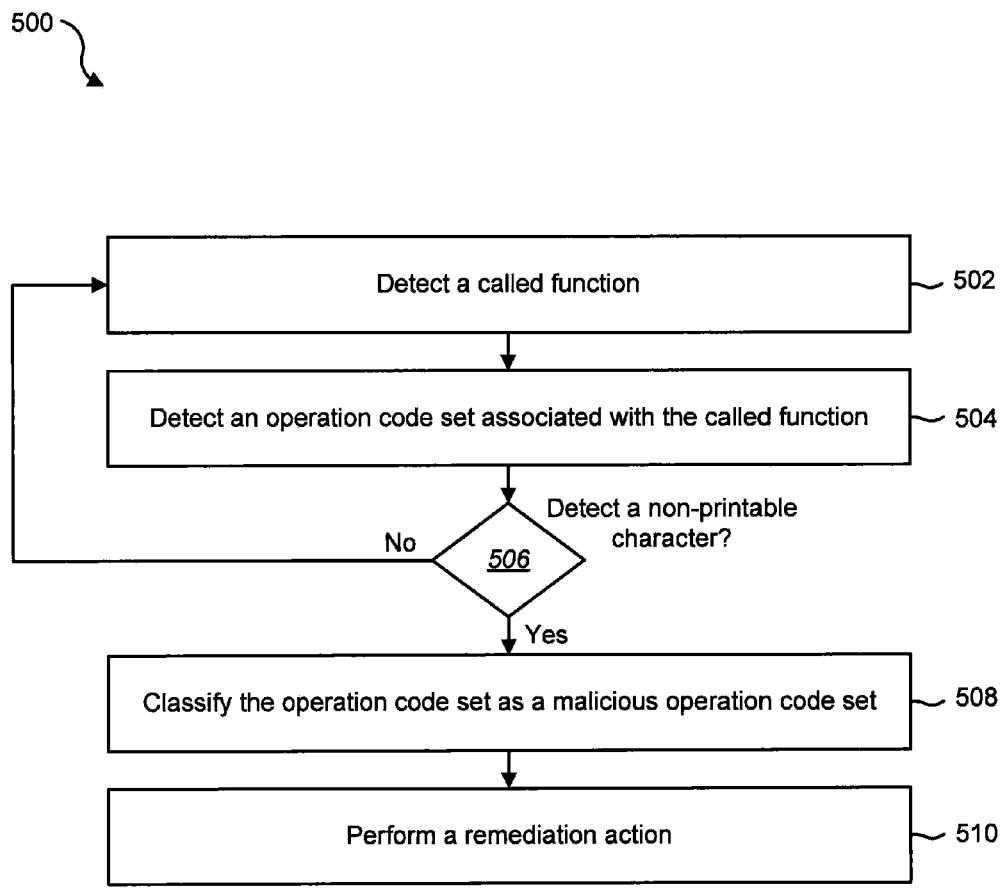
FIG. 5 is a flow diagram illustrating a further embodiment of a method to detect malicious code in an operation code (opcode) set.

FIG. 5 is a flow diagram illustrating a further embodiment of a method 500 to detect malicious code in an opcode set. In particular, the method 500 may detect a NOP sled or shellcode included in the opcode set. In one embodiment, the method 500 may be implemented by the protection application 104.

In one example, a called function may be detected 502. An opcode set associated with the called function may also be detected 504. A determination may be made as to whether a non-printable character is detected in the opcode set. If it is determined 506 that a non-printable character is not detected, the method 500 may return to detect 502 a called function. If, however, it is determined 506 that a non-printable character is detected, the opcode set may be classified 508 as a malicious opcode set. In one example, the NOP sled or shellcode detected in the opcode set may be classified as malicious. In one embodiment, a remediation action may be performed 510. For example, the opcode set may be blocked from executing. Alternatively, or in addition, a warning may be reported to a user.

Figure 6:
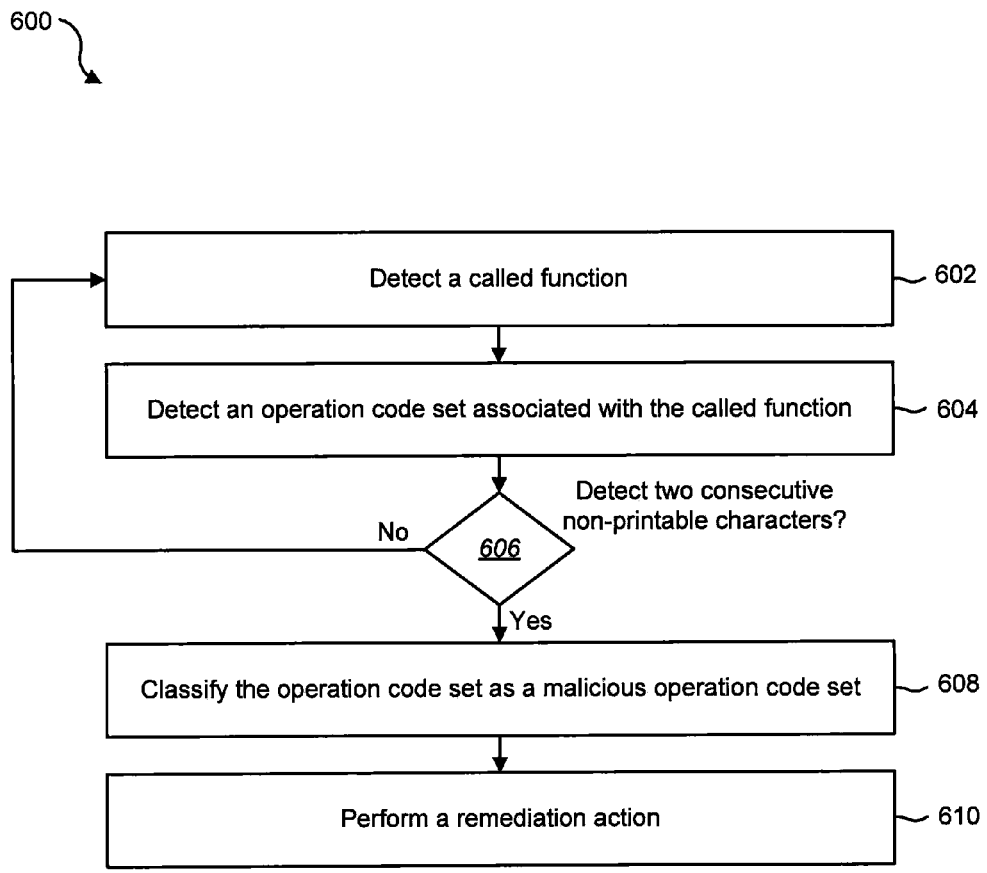
FIG. 6 is a flow diagram illustrating a further embodiment of a method to detect malicious code (such as a no-operation performed (NOP) sled or shellcode) in an opcode set.

FIG. 6 is a flow diagram illustrating a further embodiment of a method 600 to detect malicious code (such as a NOP sled or shellcode) in an opcode set. In one embodiment, the method 600 may be implemented by the protection application 104.

In one embodiment, a called function may be detected 602. An opcode set associated with the called function may also be detected 604. For example, the opcode set that called the function may be identified. A determination 606 may be made as to whether two consecutive non-printable characters are detected in the opcode set. If it is determined 606 that two consecutive non-printable characters are not detected, the method 600 may return to detect 602 a called function. If, however, it is determined 606 that two consecutive non-printable characters are detected, the opcode set may be classified 608 as a malicious opcode set. In addition, a remediation action may be performed 610. The remediation action may include blocking the execution of the opcode set, sending a notification to a user, and the like.

Figure 7:
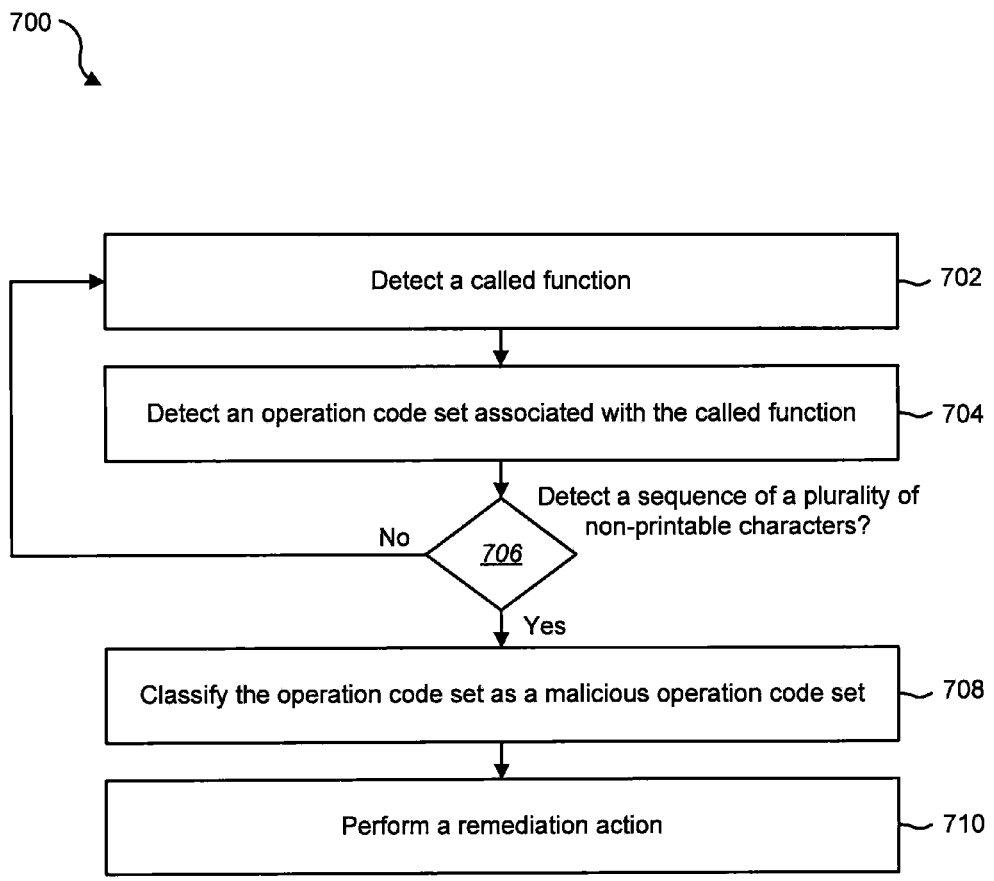
FIG. 7 is a flow diagram illustrating another embodiment of a method to detect malicious code in an opcode set.

FIG. 7 is a flow diagram illustrating another embodiment of a method 700 to detect malicious code in an opcode set. The method 700 may be implemented by the protection application 104.

In one configuration, a called function may be detected 702. An opcode set associated with the called function may also be detected 704. A determination 706 may be made as to whether a sequence of a plurality of non-printable characters is detected in the opcode set. For example, the opcode set may include a NOP sled section and/or a shellcode section. The method 700 may determine whether one or both of these sections include a sequence of a plurality of non-printable characters. If it is determined 706 that a sequence of a plurality of non-printable characters is not detected, the method 700 may return to detect 702 a called function. If, however, it is determined 706 that a sequence of a plurality of non-printable characters is detected, the opcode set may be classified 708 as a malicious opcode set. In particular, the detected NOP sled and/or shellcode may be classified 708 as malicious In addition, a remediation action may be performed 710.

Figure 8:
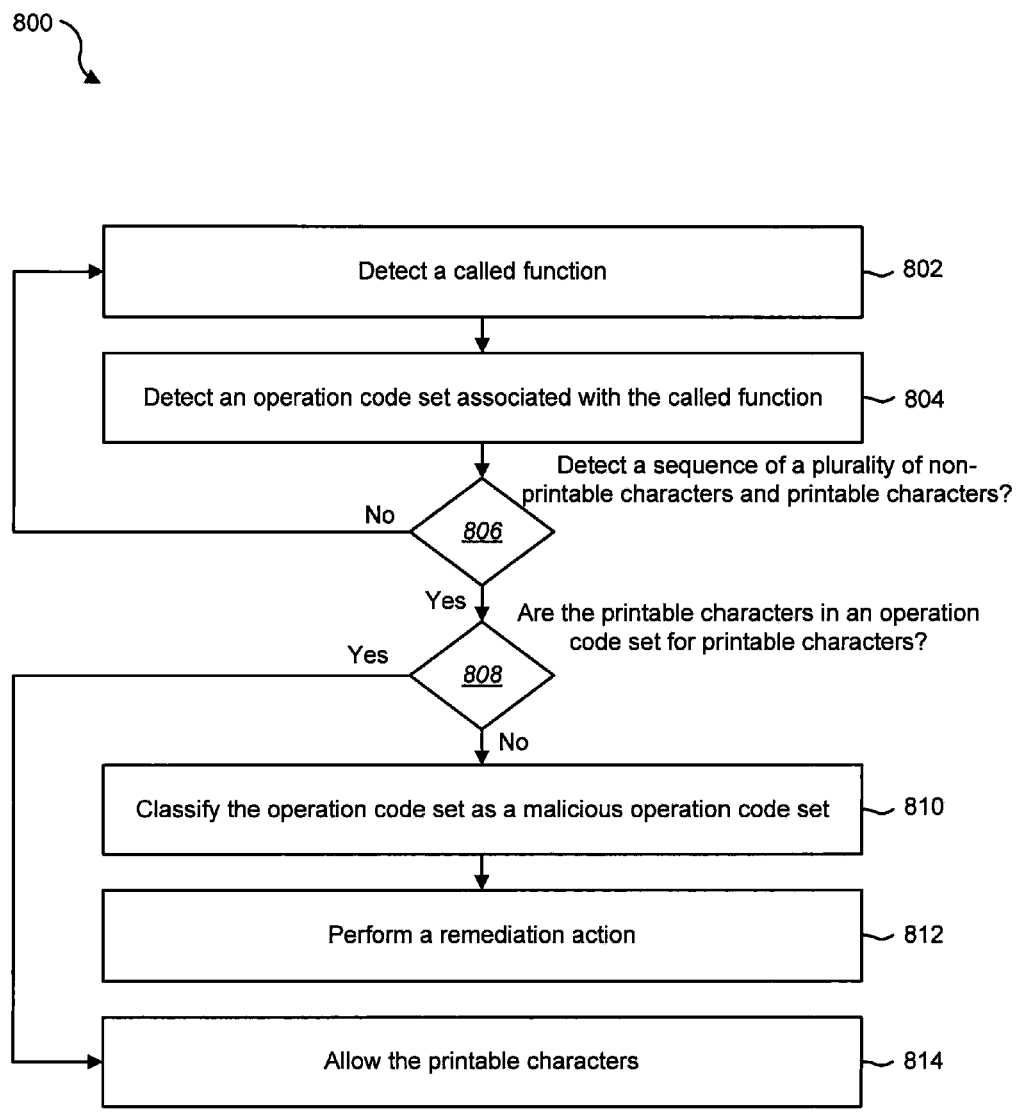
FIG. 8 is a flow diagram illustrating another embodiment of a method to detect malicious code in an opcode set.

FIG. 8 is a flow diagram illustrating another embodiment of a method 800 to detect malicious code in an opcode set. In one embodiment, the method 800 may be implemented by the protection application 104.

In one example, a called function may be detected 802. The called function may be a JavaScript function. In addition, an opcode set associated with the called function may also be detected 804. For example, the opcode set that called the JavaScript function may be detected 804. A first determination 806 may be made as to whether a sequence of a plurality of non-printable characters and printable characters is detected in the opcode set. If it is determined 806 that a sequence is not detected, the method 800 may return to detect 802 a called function. If, however, it is determined 806 that a sequence is detected, a second determination 808 may be made as to whether the detected printable characters are included in an opcode set for printable characters. If it is determined 808 that the printable characters are included in an opcode set for printable characters, the method 800 may continue to allow 814 the printable characters. If, however, it is determined 808 that the printable characters are not included in an opcode set for printable characters, the opcode set may be classified 810 as a malicious opcode set. In addition, a remediation action may be performed 812, as previously described.

Figure 9:
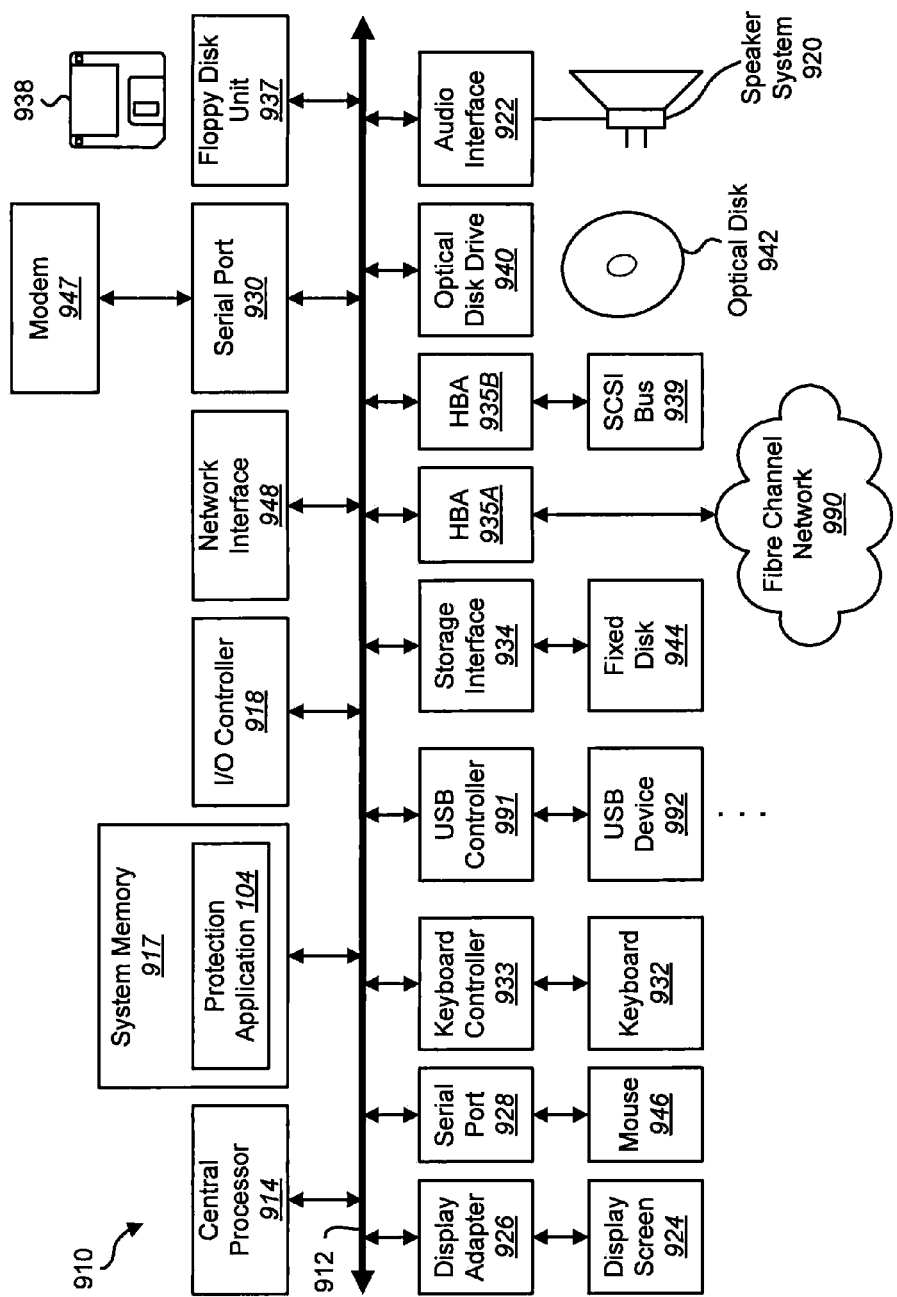
FIG. 9 depicts a block diagram of a computer system suitable for implementing the present systems and methods.

FIG. 9 depicts a block diagram of a computer system 910 suitable for implementing the present systems and methods. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), multiple USB devices 992 (interfaced with a USB controller 990), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the protection application 104 to implement the present systems and methods may be stored within the system memory 917. Applications resident with computer system 910 are generally stored on and accessed via a computer readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present systems and methods. The devices and subsystems can be interconnected in different ways from that shown in FIG. 9. The operation of a computer system such as that shown in FIG. 9 is readily known in the art and is not discussed in detail in this application. Code to implement the present disclosure can be stored in computer-readable medium such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
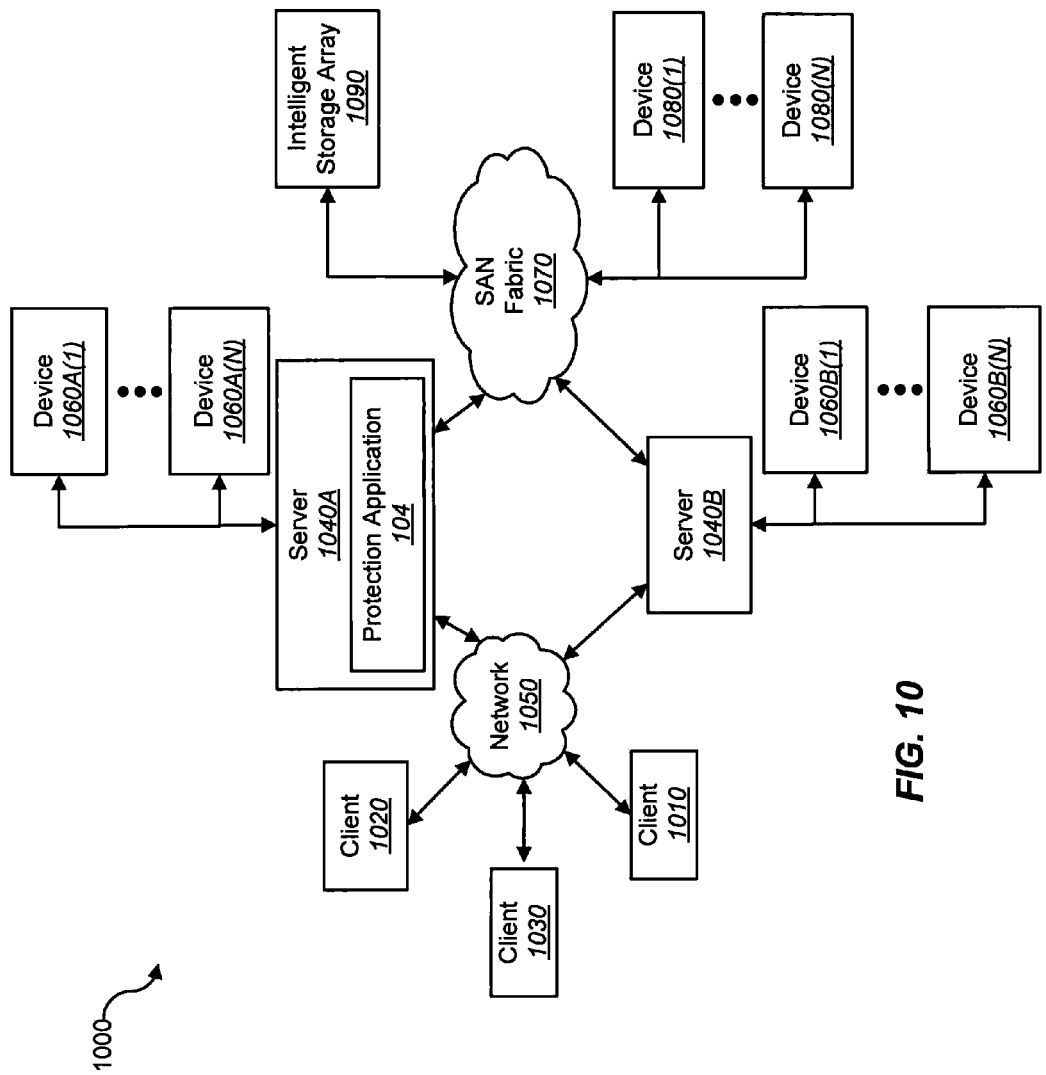
FIG. 10 is a block diagram depicting a network architecture in which client systems, as well as storage servers (any of which can be implemented using computer system), are coupled to a network.

FIG. 10 is a block diagram depicting a network architecture 1000 in which client systems 1010, 1020 and 1030, as well as storage servers 1040A and 1040B (any of which can be implemented using computer system 1010), are coupled to a network 1050. In one embodiment, the protection application 104 may be located within a server 1040A, 1040B to implement the present systems and methods. The storage server 1040A is further depicted as having storage devices 1060A(1)-(N) directly attached, and storage server 1040B is depicted with storage devices 1060B(1)-(N) directly attached. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020, and 1030 to network 1050. Client systems 1010, 1020, and 1030 are able to access information on storage server 1040A or 1040B using, for example, a web browser or other client software (not shown). Such a client allows client systems 1010, 1020, and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to detect malicious code in a script attack, comprising:
   detecting an activity associated with calling a function;
   identifying an operation code set associated with the activity to call the function;
   determining a reputation score for a website associated with the operation code set; and
   upon determining the reputation of the website satisfies a threshold, initiating buffer overflow detection actions, the buffer overflow detection actions comprising:
      identifying a predetermined sequence of characters included in the operation code set;
      analyzing the identified predetermined sequence of characters, wherein analyzing the identified predetermined sequence of characters comprises detecting any non-printable characters;
      upon detecting at least one non-printable character included in the operation code set, performing a first action, wherein performing a first action comprises generating a warning;
      upon detecting two consecutive non-printable characters included in the operation code set, classifying the operation code set as malicious;
      identifying at least one printable character included in the operation code set;
      determining whether the operation code set is of a type of code set for printable characters; and
      upon determining at least one printable character is included in the operation code set and the operation code set is of the type of code set for printable characters, continuing to allow the at least one printable character to execute;
      upon determining at least one printable character is included in the operation code set and that the operation code set is not of the type of code set for printable characters, classifying the operation code set as malicious.

2. The method of claim 1, wherein the operation code set includes a no-operation performed (NOP) sled.

3. The method of claim 1, wherein the operation code set includes shellcode.

4. The method of claim 1, wherein the called function comprises a JavaScript function.

5. The method of claim 4, wherein the JavaScript function comprises at least one of the following functions: Unescape, Eval, CharCodeAt, Split, or Char.

6. A computing device configured to detect malicious code in a script attack, comprising:
   a processor;
   memory in electronic communication with the processor; and
   instructions stored in the memory, the instructions being executable by the processor to:
      detect an activity associated with calling a function;
      identify an operation code set associated with the activity to call the function;
      determine a reputation score for a website associated with the operation code set; and
      upon determining the reputation of the website satisfies a threshold, initiate buffer overflow detection actions, the buffer overflow detection actions comprising:
         identify a predetermined sequence of characters included in the operation code set;
         analyze the identified predetermined sequence of characters, wherein analyzing the identified predetermined sequence of characters comprises detecting any non-printable characters;
         upon detecting at least one non-printable character included in the operation code set, perform a first action, wherein the instructions to perform a first action comprise instructions executable by the processor to generate a warning;
         upon detecting two consecutive non-printable characters included in the operation code set, classify the operation code set as malicious;
         identify at least one printable character included in the operation code set;
         determine whether the operation code set is of a type of code set for printable characters;
         upon determining at least one printable character is included in the operation code set and the operation code set is of the type of code set for printable characters, continue to allow the at least one printable character to execute; and
         upon determining at least one printable character is included in the operation code set and that the operation code set is not of the type of code set for printable characters, classify the operation code set as malicious.

7. The computing device of claim 6, wherein the operation code set includes a no-operation performed (NOP) sled.

8. The computing device of claim 6, wherein the operation code set includes shellcode.

9. The computing device of claim 6, wherein the called function comprises a JavaScript function.

10. The computing device of claim 9, wherein the JavaScript function comprises at least one of the following functions: Unescape, Eval, CharCodeAt, Split, or Char.

11. A computer-program product for detecting malicious code in a script attack, the computer-program product comprising a non-transitory computer-readable medium having instructions thereon, the instructions comprising:
   code programmed to detect an activity associated with calling a function;
   code programmed to identify an operation code set associated with the activity to call the function;
   code programmed to determine a reputation score for a website associated with the operation code set; and upon determining the reputation of the website satisfies a threshold, code programmed to initiate buffer overflow detection actions, the buffer overflow detection actions comprising:
- code programmed to identify a predetermined sequence of characters included in the operation code set;
- code programmed to analyze the identified predetermined sequence of characters, wherein analyzing the identified predetermined sequence of characters comprises detecting any non-printable characters;
- upon detecting at least one non-printable character included in the operation code set, code programmed to perform a first action, wherein the code programmed to perform a first action comprises code programmed to generate a warning;
- upon detecting two consecutive non-printable characters included in the operation code set, code programmed to classify the operation code set as malicious; and
- code programmed to identify at least one printable character included in the operation code set;
- code programmed to determine whether the operation code set is of a type of code set for printable characters;
- upon determining at least one printable character is included in the operation code set and the operation code set is of the type of code set for printable characters, code programmed to continue to allow the at least one printable character to execute; and
- upon determining at least one printable character is included in the operation code set and that the operation code set is not of the type of code set for printable characters, code programmed to classify the operation code set as malicious.

12. The computer-program product of claim 11, wherein the operation code set includes a no-operation performed (NOP) sled.

* * * * *